US006611888B2

(12) United States Patent
Tiede

(10) Patent No.: US 6,611,888 B2
(45) Date of Patent: Aug. 26, 2003

(54) INTEGRATED CONNECTOR HAVING A MEMORY UNIT FOR A RECEIVER

(75) Inventor: Lutz-Wolfgang Tiede, Babenhausen (DE)

(73) Assignee: Siemens VDO Automotive AG, Frankfurt (DE)

( * ) Notice: Subject to any disclaimer, the term of this patent is extended or adjusted under 35 U.S.C. 154(b) by 0 days.

(21) Appl. No.: 09/388,039

(22) Filed: Sep. 1, 1999

(65) Prior Publication Data
US 2002/0069336 A1 Jun. 6, 2002

(30) Foreign Application Priority Data

Sep. 1, 1998 (DE) .......................... 198 39 685

(51) Int. Cl.⁷ .............................. G06F 13/00
(52) U.S. Cl. .............. 710/63; 710/62; 710/64; 701/200; 701/213; 701/1
(58) Field of Search .................. 710/63, 62, 64, 710/129, 130, 8; 701/35, 36, 58, 200, 213; 340/425.5

(56) References Cited

U.S. PATENT DOCUMENTS

| | | | | |
|---|---|---|---|---|
| RE31,582 E | * | 5/1984 | Hosaka et al. .............. 701/102 |
| 4,972,470 A | * | 11/1990 | Farago ....................... 713/192 |
| 5,058,044 A | * | 10/1991 | Stewart et al. .............. 702/184 |
| 5,157,610 A | * | 10/1992 | Asano et al. ................. 701/32 |
| 5,557,254 A | * | 9/1996 | Johnson et al. ............. 340/426 |
| 5,568,390 A | * | 10/1996 | Hirota et al. ................ 701/201 |
| 5,576,716 A | * | 11/1996 | Sadler .................... 342/357.07 |
| 5,717,387 A | * | 2/1998 | Suman et al. ................. 701/36 |
| 5,760,742 A | * | 6/1998 | Branch et al. ............... 342/457 |
| 5,919,246 A | * | 7/1999 | Waizmann et al. .......... 701/209 |
| 5,928,347 A | * | 7/1999 | Jones ........................ 710/129 |
| 6,028,537 A | * | 2/2000 | Suman et al. ............... 340/988 |
| 6,049,269 A | * | 4/2000 | Byrd et al. ................. 340/426 |
| 6,088,755 A | * | 7/2000 | Kobayashi et al. ......... 710/129 |
| 6,138,178 A | * | 10/2000 | Watanabe ...................... 710/8 |
| 6,216,085 B1 | * | 4/2001 | Emmerink et al. .......... 701/117 |

FOREIGN PATENT DOCUMENTS

| | | |
|---|---|---|
| DE | 3428237 | 7/1984 |
| DE | 19527185 A1 | 7/1995 |
| EP | 0725502 A2 | 12/1995 |
| EP | 0745964 A1 | 5/1996 |
| WO | WO94/11802 | 5/1994 |

\* cited by examiner

*Primary Examiner*—Hong Kim
(74) *Attorney, Agent, or Firm*—Mayer, Brown, Rowe & Maw

(57) ABSTRACT

In a data memory (2) which is arranged in a vehicle, an interface (6), which is equipped with a plug connection (5), is used to connect a receiver unit (1). The individual software modules which, depending on the design, are necessary for decoding the signals of the receiver unit (1) may be called up by means of a memory unit (7) for the data memory (2). The memory unit (7) is arranged at the interface (6). A precautionary storage of all the relevant software modules in the data memory (2), and the associated laborious manual configuration can thus be eliminated and incorrect assignment of the software module to the existing receiver unit (1) may be avoided. At the same time, new developments in the field of software modules may be incorporated into already existing data storage systems without difficulty.

8 Claims, 1 Drawing Sheet

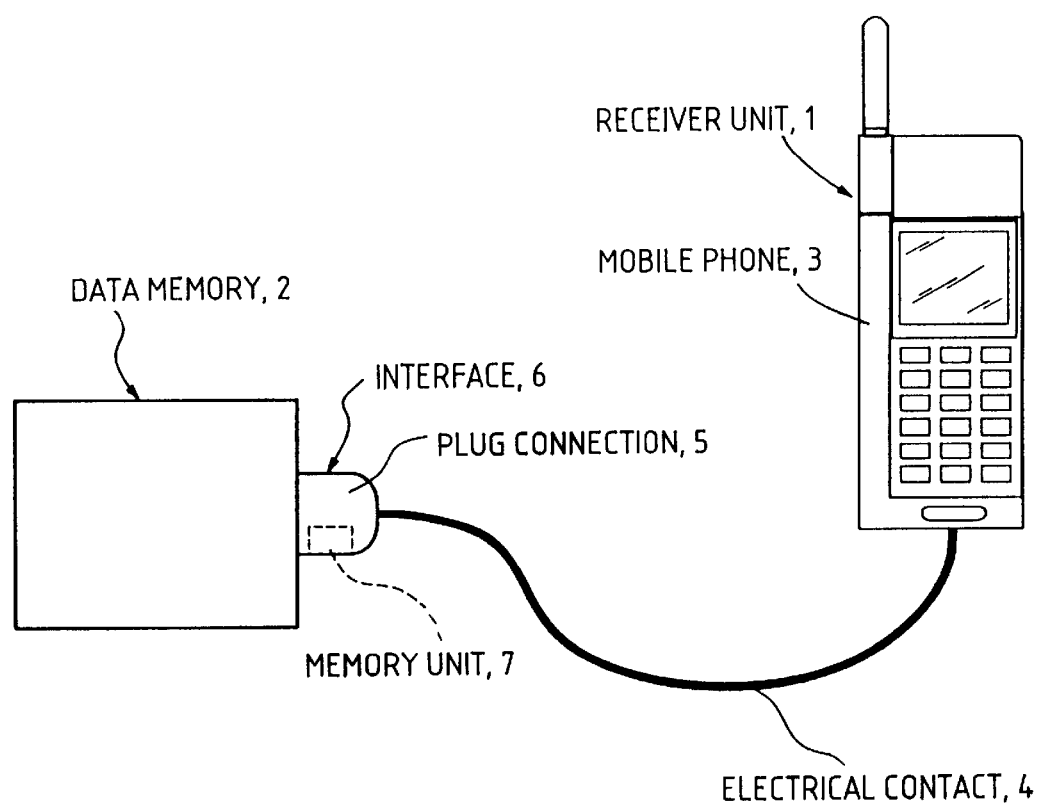

INTEGRATED CONNECTOR HAVING A MEMORY UNIT FOR A RECEIVER

FIELD OF INVENTION

The invention relates to a data memory in a motor vehicle which is connected to a receiver unit for radio signals by an interface.

BACKGROUND OF THE INVENTION

Data memories are being increasingly used in contemporary vehicles in order to provide the driver with, for example, data relating to current events on the road. Thus, it has already become possible to determine the position of the vehicle with a high degree of accuracy on the basis of the data received and to compare the position with digitized road maps so that the driver can be directed to a predetermined destination. The quantities of data which can be transmitted permit rapid availability in this context and thus ensure increased driving safety and improved comfort.

As a result of the sudden technical development of receiver units, a large number of different devices, which each require a specific interface for connection to the data memory have become available. In order to transmit the signals it is necessary to have corresponding software modules in the data memory. A disadvantageous effect of this is that the software modules are usually compatible with a few, or even one receiver unit. Thus, a plurality of such software modules must be provided for the data memory if flexible connection of different devices desired. The selection of the suitable software module is made manually using a configuration menu, after contact has been made. The expenditure which is necessary for the selection of the corresponding software module is therefore relatively large and at the same time malfunctions may occur as a result of an incorrect selection of the software module.

An object of the present invention is therefore to implement a data memory of the preceding type such that a manual configuration of a specific software module for the receiver unit which is connected by an interface may be eliminated. In this context, it would be desirable to permit different receiver units to be connected in a flexible way and to make particularly simple control possible.

SUMMARY OF THE INVENTION

This object is achieved according to the invention by an interface with a memory unit for specific data of a receiver unit. As a result of the storage of the specific data of the receiver unit in the memory unit of the interface, the data which is necessary for decoding is transferred automatically by means of connecting the interface to the data memory. The connection of another receiver unit is simultaneously also tied to the replacement of the interface so that additional manual adaptation is unnecessary. In particular, incorrect configuration is largely eliminated and the storage capacity of the data memory is reduced by storing the data in the memory unit of the interface. At the same time it is also possible to use receiver units which were not yet available when the data memory was first put into operation, is because the data which is necessary for the new receiver units is available by means of the memory unit of the interface for the data memory. This enables flexibility to be considerably increased.

The interface may contain specific data of the receiver unit which include adaptation and changing of the software which is contained in the data memory and/or the parameters which are required for this. An embodiment of the invention in which the interface contains different software modules is particularly favorable. The software modules which are necessary for processing the data may thus be implemented largely independently of the data memory, as a component of the interface. The adaptation or changing of the software modules therefore requires comparatively little expenditure and operational reliability is possible without difficulty. In particular the invention allows adaptation of the software modules to continuing developments in the software field.

Another, particularly favorable embodiment of the invention is also obtained by the interface having electronic components which are designed to adjust the signals between the receiver unit and data memory. Here, the signal levels are adapted using the electronic components. The adaptation thus permits decoding and further processing by means of the software modules. As a result, simple and, at the same time, cost-effective manufacture can be achieved.

A development of the invention in which the interface has an arithmetic unit is also particularly advantageous. Thus, within the interface, the standard signals which are captured by the receiver unit may be converted by means of the software module present in the memory unit, into signals which can be read by the data memory. The data memory becomes largely independent of the software module of the receiver unit.

One development of the invention involves equipping the interface with a plug connection which is particularly versatile and particularly convenient in practice. As a result, new add-ons can be connected to the existing data memory even by unskilled persons without difficulty. At the same time, an appropriate embodiment of the plug connection also permits connection exclusively to devices which are provided for connecting the respective receiver unit. The interface which is designed in this way can be handled extremely easily by carrying out just a single manual operation.

In one simple embodiment, the receiver unit could be a suitable antenna. A particularly favorable embodiment of the invention is also obtained by the receiver unit having a mobile phone. This permits a large amount of current information to be captured and held in the data memory for further use. Thus, it is possible, for example, to provide traffic data by means of the mobile phone in a way which is adapted to the location. In particular, the increasingly widespread use of mobile phones may be used to make data available in a virtually unlimited way. In particular, this also makes it possible to exchange data between vehicles.

One development of the invention makes it possible to determine the location on a worldwide, virtually unrestricted basis, but still with a high level of precision, by virtue the receiver unit having a GPS receiver. This satellite-supported positioning system permits a worldwide, fully accessible use and is thus highly suitable for supplementing the data contained in the data memory.

One embodiment in which the receiver unit is a radio receiver is also particularly favorable. As a result, the radio receivers which are already present in the vehicle in most cases can be connected to the data memory in an optimum way and, for example, the traffic information which is broadcast by radio stations can be stored and evaluated. A cost-effective way of implementing this is made possible by the widespread use of radio receivers in vehicles It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE DRAWINGS

The invention permits numerous embodiments. In order to illustrate its basic principle, these embodiments are described hereinbelow and are illustrated in the drawing, in which:

FIG. 1 shows a basic view of the connection of a receiver unit to a data memory for purposes of the present invention.

DETAILED DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Identical parts in the figures are provided with identical reference symbols. The invention permits various embodiments. In order to clarify its basic principle further, one of these embodiments is illustrated in the drawing and will be described below. FIG. 1 shows a basic view of the connection of a receiver unit 1 to a data memory 2. The receiver unit 1 which is embodied as a mobile phone 3 is connected by means of an electric contact 4 to an interface 6 which has a plug connection 5. The interface 6 has, as an integral component, a memory unit 7 which contains specific data of the mobile phone 3. The signals which are received by means of the mobile phone 3 are transferred to the data memory 2, and the software modules which are present in the memory unit 7 of the interface 6 and are necessary for decoding the signals are also captured by the data memory 2 at the same time.

Faulty insertion of the plug connection 5 is avoided here by appropriate design of the plug connection 5. The components which continue to be connected to the data memory 2, and which, in particular, permit further processing of the captured data and conversion into information which is suitable for the user, are not illustrated. Furthermore, additional receiver units can be connected to the data memory 2 and appropriately supplement the available data.

Another, particularly favorable embodiment of the invention is also obtained by the interface having electronic components which are designed to adjust the signals between the receiver unit and data memory. The signal levels are adapted using the electronic components thus permitting decoding and further processing by the software modules. As a result, simple and cost-effective manufacture of the components may be achieved.

The interface may also have an arithmetic unit. Within the interface, the standard signals which are captured by the receiver unit may be converted by means of the software module present in the memory unit, into signals which can be read by the data memory. As a result, the data memory becomes largely independent of the software module of the receiver unit.

The interface may also be equipped with a plug connection which is particularly versatile and particularly convenient in practice. As a result, new add-ons can be connected to the existing data memory even by unskilled persons without difficulty. At the same time, an appropriate embodiment of the plug connection also permits connection exclusively to devices which are provided for connecting the respective receiver unit. The resulting interface may be handled easily by carrying out just a single manual operation.

The receiver unit may be a suitable antenna. Alternatively, the receiver unit may also have a mobile phone. This permits a large amount of current information to be captured and held in the data memory for further use. Thus, it is possible, for example, to provide traffic data by means of the mobile phone in a way which is adapted to the location. In particular, the increasingly widespread use of mobile phones may be used to make data available in a virtually unlimited way. In particular, this also makes it possible to exchange data between vehicles.

The receiver unit may also have a GPS receiver making it possible to determine the location of the unit on a worldwide, virtually unrestricted basis, but still with a high level of precision. This satellite-supported positioning system permits a worldwide, fully accessible use and is thus highly suitable for supplementing the data contained in the data memory.

The receiver unit may also be a radio receiver which allows existing radio receivers already in the vehicle to be connected to the data memory in an optimum way. Thus, for example, the traffic information which is broadcast by radio stations may be stored and evaluated. A cost-effective way of implementing this is made possible by the widespread use of radio receivers in vehicles.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A connector for sending data from a receiver unit for radio signals to a data memory in a vehicle, the connector comprising:
    a modular plug connector allowing interface to different types of data jacks and connectable to different types of data jacks;
    an integrated memory unit having software for specific data of the receiver unit contained within the plug connector;
    an electrical contact mateable to the receiver unit; and
    wherein the software in the integrated memory unit processes data from the receiver and converts the data for the data memory of the vehicle.

2. The connector as claimed in claim 1, wherein the memory unit contains various software modules.

3. The connector as claimed in claim 1 further comprising electronic components which are designed to adjust signals between the receiver unit (1) and the data memory (2).

4. The connector as claimed in claim 1 further comprising an arithmetic unit.

5. The connector as claimed in claim 1, wherein the receiver unit (1) has a mobile phone (3).

6. The connector as claimed in claim 1, wherein the receiver unit (1) has a GPS receiver.

7. The connector as claimed in claim 2, wherein the receiver unit (1) is a radio receiver.

8. A plug connector for sending data from a receiver unit for radio signals to a data memory in a vehicle, the connector comprising:
    a cylindrical body allowing interface to different types of data jacks and connectable to different types of data jacks;
    an integrated memory unit having software for specific data of the receiver unit contained within the plug connector;
    an electrical contact mateable to the receiver unit; and
    wherein the software in the integrated memory unit processes data from the receiver and converts the data for the data memory of the vehicle.

* * * * *